United States Patent [19]

Nees

[11] 4,081,586
[45] Mar. 28, 1978

[54] DISPOSABLE BATTERY PACKAGE FOR CHARGED AND DUMPED BATTERIES

[75] Inventor: John M. Nees, Wyomissing, Pa.

[73] Assignee: General Battery Corporation, Reading, Pa.

[21] Appl. No.: 790,880

[22] Filed: Apr. 26, 1977

[51] Int. Cl.² ............................................. H01M 2/04
[52] U.S. Cl. ........................................ 429/48; 429/118
[58] Field of Search ...................... 429/48, 87, 88, 89, 429/82, 122, 175, 118, 163

[56] References Cited

U.S. PATENT DOCUMENTS

| 1,907,911 | 5/1933 | Wallace et al. | 429/48 |
| 2,640,091 | 5/1953 | Pucher et al. | 429/118 |
| 2,972,001 | 2/1961 | Clingenpeel | 429/89 |
| 3,366,511 | 1/1968 | Rousey | 429/175 |
| 3,941,617 | 3/1976 | Nees | 429/87 |

Primary Examiner—Donald L. Walton
Attorney, Agent, or Firm—Benasutti Associates, Ltd.

[57] ABSTRACT

A novel battery package is described wherein a sealing strip having a plurality of minute vent holes, one for each opening in the battery case, is retained in place by a plurality of disposable inserts which retain the strip in place and which seal the strip at least around the top surface of each of the battery case venting ports. An adhesive strip is applied to engage each disposable insert and to engage the sealing strip, as well as the edges of the battery case in such a manner so that, upon activation, the entire battery package may be removed and disposed of by loosening one end of the sealing strip and pulling that strip up and across the top of the battery to expose each of the fill holes for activation.

15 Claims, 6 Drawing Figures

DISPOSABLE BATTERY PACKAGE FOR CHARGED AND DUMPED BATTERIES

BACKGROUND OF THE INVENTION

The present invention relates to the electric storage battery art, and more particularly, to a new and improved battery package and method of making same, for shipping and storing an electric storage battery which has been charged and dumped and which contains a residual amount of electrolyte in the battery plates and cells. More particularly, the present invention is an improvement over the invention disclosed in my prior issued U.S. Pat. No. 3,941,617, the disclosure of which patent is specifically incorporated by reference as if fully set forth herein.

The so-called charged and dumped battery has been well known for decades. Such batteries are produced for many purposes, including without limitation, the prevention of spillage of electrolyte during transit and the increased storage life while the battery is being stored. In the prior art, numerous venting mechanisms have been provided so that the storage battery in a fully charged condition may be stored after removal of the electrolyte for many months without material loss of capacity and without developing excessive pressure. See for example, the patent to J. L. Woodbridge U.S. Pat. No. 1,816,035, issued July 28, 1931, and the patents to C. C. Wallace, U.S. Pat. Nos. 1,758,545 and 1,907,911. These patents show vent caps with holes therein having a very small cross-section. For example, the Wallace patent shows a device which has a horizontal opening of very small diameter with respect to its length. The Woodbridge patent provides a duct which has a cross-section of a diameter not over 5 percent of its length. Both patents refer to a capillary duct of minute cross-section. More recently the Sabatino U.S. Pat. No. 3,253,963 deals generally with the same problems. Similarly, please refer to abandoned patent application Ser. No. 377,563, filed July 9, 1973 and abandoned patent application Ser. No. 486,662, filed July 8, 1974, entitled "Battery Vent Seal," wherein seals are disclosed which are formed with: a conical body adapted to be sealingly wedged into a fill hole opening, a surrounding lip which engages the top of the fill hole when the body is pressed into place, and a small aperture formed through the seal for resisting gas flow but permitting gas after a slight pressure build-up to be vented from the cell. Generally, these disclosures show individual vent plugs which are either rather complicated in structure or require a substantial amount of material.

SUMMARY OF THE INVENTION

It is an object of the present invention to provide a simple venting device for use in combination with a charged and dumped battery, so that the battery may be shipped and stored inexpensively and with maximum effectiveness in terms of shelf life. In furtherance of this object, I have provided a thin strip of plastic material having a plurality of indentations therein forming protrusions, each of which has a small vent hole in it. This piece of plastic is applied to all of the vent openings in a charged and dumped battery, and a plurality of disposable inserts are inserted into the vent openings for at least retaining the sealing strip against the top surface of the vent openings to form a seal therebetween. In addition, an overlying tape strip spans the vent openings, sandwiches the disposable inserts between the tape and the sealing strip, and attaches the assembly at either end to the battery itself, so that, when activation is desired, the entire package may be peeled away from the battery and disposed of in a single motion.

The above object, as well as other objects, will become apparent from the following description with reference to the accompanying drawings.

DESCRIPTION OF THE PREFERRED EMBODIMENT

Figure 2:
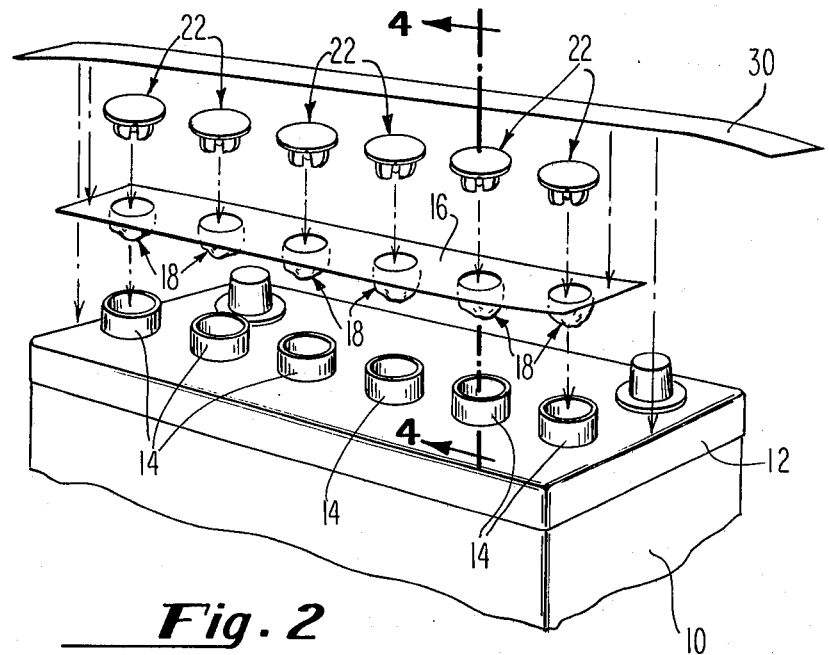
FIG. 2 is a perspective view of the battery and battery package illustrated in FIG. 1 wherein the sealing strip disposable inserts and tape are shown exploded away from the top of the battery and arrows indicating the assembly sequence of the package.

Although specific forms of the invention have been selected for illustration in the drawings, and the following description is drawn in specific terms for the purpose of describing these forms of the invention, this descirption is not intended to limit the scope of the invention which is defined in the appended claims.

Figure 1:
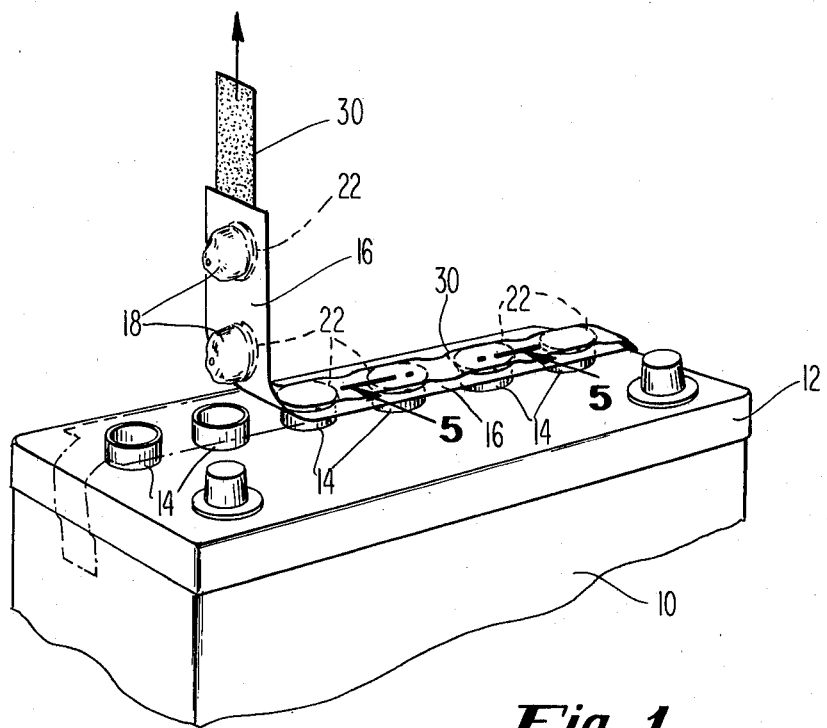
FIG. 1 is a top perspective view of a charged and dumped battery from which the preferred embodiment battery package is being peeled away, the original position of that package being shown in phantom.

Referring to the figures, in FIG. 1, there is shown a perspective view of an assembled battery package wherein the battery case 10 comprises a structure housing six battery cells for a lead-acid storage battery which has a cover 12, having six vent openings 14 formed integrally with the cover. A venting strip 16 is illustrated which is described in greater detail in connection with my prior U.S. Pat. No. 3,941,617, which is specifically incorporated herein by reference. Basically, this cover strip 16 is composed of a thin plastic material having a generally planar top surface in which is formed a plurality of indentations forming protrusions designated generally 18 which are generally bag-shaped but which diameters, at their intersection with the aforementioned planar surface, approximately equals the interior diameter of each of the vent wells 14. A small hole 20 is formed in approximately the center of the bottom of each bag-shaped protrusion 18. As seen particularly in FIG. 1, the strip 16 is generally rectangular having a width which substantially exceeds the width of the fill holes; as opposed to the width of the adhesive strip 30 which is applied thereover which has a width approximately equal to the outside diameter of fill holes 14.

Figure 3:
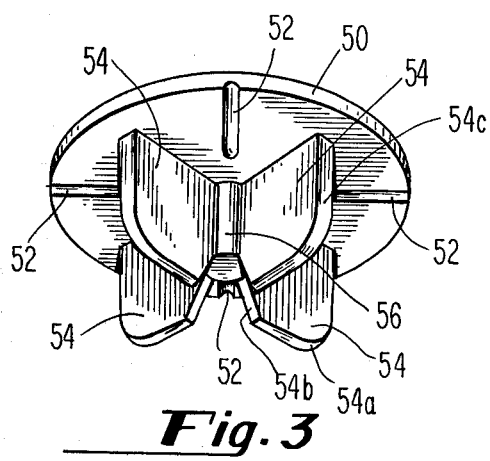
FIG. 3 is a greatly enlarged perspective view generally showing the undersurface of the preferred embodiment disposable insert of the present invention.
Figure 4:
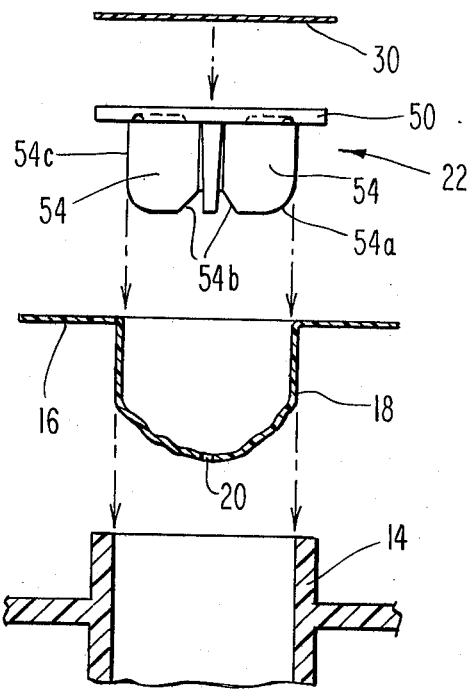
FIG. 4 is an exploded cross-section on an enlarged scale taken as indicated by the lines and arrows 4—4 in FIG. 2.

In accordance with the preferred embodiment of the present invention, a plurality of disposable inserts designated generally 22 are provided which are constructed and function as follows: referring in particular to FIG. 3, each disposable insert is molded of a polypropylene copolymer or other similar material and comprises a substantially planar, disk-shaped top 50, in the undersurface of which a plurality of venting channels 52 are formed. In the preferred embodiment, as seen particularly in FIGS. 4 and 5, the outside diameter of the top 50 of each insert is approximately equal to the outside diameter of the fill hole into which it is to be inserted. Protruding down and away from the top 50 of each insert are a plurality of radially spaced fins 54 which are disposed around a central column 56. Each fin is seen to be disposed substantially perpendicular to the top 50 and to have a rounded corner portion 54a and a bevel 54b disposed adjacent to central column 56. In the preferred embodiment, these fins form an X-shaped cross-section with central column 56, as particularly seen in FIG. 6. Since the central column 56 extends away from the top 50 for a distance substantially less than that of each of the fins 54, and since each of the fins is beveled as shown in the drawings, a small pocket 60 is created by the insert generally adjacent the minute vent hole 20 in the fill strip, so that upon generation of pressure within the battery, the opening 20 can not be fouled or closed by the disposable insert. Together the fins 54 are dimensioned so that a press fit is established between the disposable inserts 22 and the interior of fill holes 14 which have been fitted with the sealing strip 16 in the manner shown in the drawings. This press fit is established between the sides 54c of the fins and the interior surfaces of the fill holes 14, between which sides and surfaces is disposed a layer of strip material 16. Unlike prior art devices wherein attempts are made to create seals with the interior walls of the fill hole, it should be noted that the fins of the disposable inserts of applicant's device are not intended to create a seal between the outer surface of the projections 18 of the strip 16 and the interior surface of the fill hole 14. These fins are adapted to slide into the fill hole until the top 50 of each insert sandwiches an annular portion of strip 16 against the top surface of each fill hole. Since most prior art devices which attempted to create a seal with the interior of a fill hole had to be applied quite securely due to the pressure build-up within the battery and limited venting area provided by the sealing means, after prolonged storage the interior configuration of the fill hole could tend to become distended, thereby preventing an appropriate fit from being established when the sealing means was removed and conventional caps reinserted.

Figure 6:
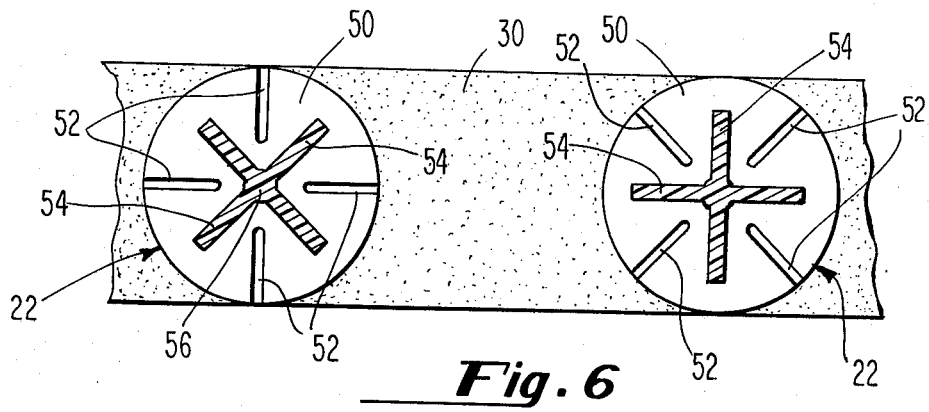
FIG. 6 is a bottom view of two of the preferred embodiment disposable inserts shown adhered to the preferred adhesive strip.

As mentioned above, on the undersurface of each insert top 50 are inscribed a plurality of venting channels 52 which are seen to generally bisect the angles described by the fins and to extend from a point adjacent and spaced apart from the central column 56 to the edge of the cap. These channels 52 insure that gases generated within the battery, will, at all times, be vented to the atmosphere. In the preferred embodiment, these venting channels may have a semi-circular cross-section and be narrow enough so that the undersurface of top 50 of the insert will nonetheless continuously seal sealing strip 16 against the top surfaces of the fill holes 14. As seen in FIG. 6, the width of adhesive strip 30 is selected so that upon application of this strip, the strip 30 will not inadvertently close the venting channels 52. By providing a wide sealing strip 16, as discussed above, the terminal portions of the channels 52 are protected from dirt accumulation which might otherwise interfere with there venting functions.

Figure 5:
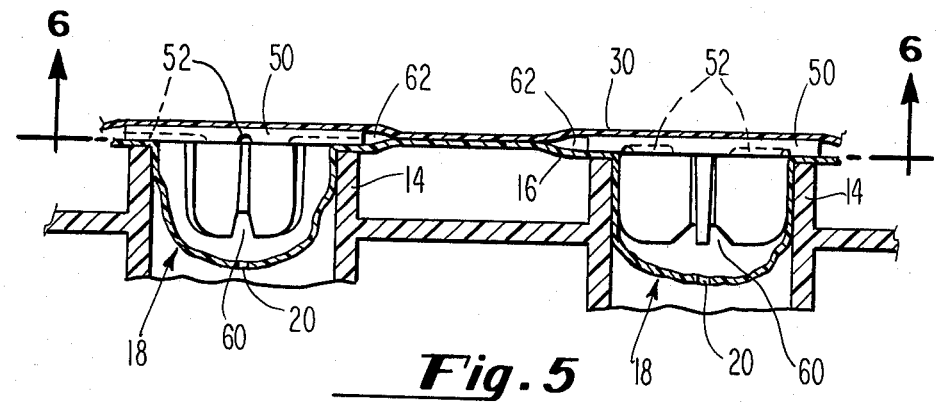
FIG. 5 is a cross-section of on an enlarged scale taken as indicated by the lines and arrows 5—5 in FIG. 1.

As a result of the novel structure of the battery package of the present invention, assembly, and disassembly of the package with respect to the battery is quick and easy. As seen in FIG. 2, the sealing strip 16 is first placed with the protrusions 18 extending generally into the fill holes. Each of the disposable inserts 22 may then be inserted and pressed down into the fill holes and the adhesive strip 30 applied as shown. As seen in FIG. 5 the adhesive strip 30 will tend to adhere to the sealing strip 16 inbetween the fill holes, but a small transverse venting channel 62 is nonetheless naturally formed adjacent the top 50 of each insert, the sealing strip 16 and the adhesive strip 30. Accordingly, while aiding in the removal of the package, as explained hereinafter, the adhesive strip does not interfere with the venting functions of the strip and insert, as described aforesaid.

When it is desired to remove the battery package in order to activate the battery, it is only necessary to peel one end of the venting strip 30 away from the battery case as shown in FIG. 1 and to pull on the adhesive strip in a generally upward direction across the top of the case, at which time the sealing strip and disposable inserts will naturally separate from the battery and the entire package may be discarded in favor of conventional operating vent caps. Accordingly, it may be seen that the ease of removal of this package is far greater than with those prior art charged and dumped batteries where individual vents were wedged into each fill hole in order to create a seal with the interiors of those fill holes.

Finally, it may be seen that for display and sales purposes the top of the battery which is in its stored condition with the package applied presents a relatively "flush look" appearance, which may be further highlighted by altering the battery cover design so that the top surfaces of the fill holes are at or below the top surface of the cover.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

What is claimed is:

1. A charged and dumped battery package, comprising:
    (a) a battery case having a plurality of venting ports therein;
    (b) battery sealing strip means disposed over at least the top surface of said ports for at least partially sealing said ports, comprising thin sheet material having a plurality of indentations thereon forming protrusions extending from one side thereof into each of said ports, each of said protrusions having a minute vent hole therein; and
    (c) a plurality of disposable insert means, at least one for each port, for at least sealing said strip means with respect to said top surface of said ports.

2. The invention of claim 1 wherein said battery package further comprises an adhesive strip applied generally over said disposable inserts to engage said inserts, said sealing strip means and at least a portion of said battery case.

3. The invention of claim 1 wherin said disposable inserts further comprise sealing means for compressing portions of said strip against at least said top surfaces of said ports.

4. The invention of claim 3 wherein said insert means further comprises insert retaining means of retaining said inserts relative to the interior surfaces of said ports by engaging said surfaces in a press fit through said protrusions.

5. The invention of claim 3 wherein said sealing means further comprises a top having a diameter substantially equal to the diameter of said port.

6. The invention of claim 3 wherein said sealing means further comprises a top having a substantially planar undersurface thereon for engaging said portions of said sealing strips.

7. The invention of claim 6 wherein said undersurface has inscribed therein a plurality of venting channels.

8. The invention of claim 4 wherein said retaining means further comprises means for spacing said minute vent hole during venting away from said insert to prevent the blocking of said minute vent hole.

9. The invention of claim 4 wherein said retaining means comprises a plurality of fins projecting generally downwardly away from said top.

10. The invention of claim 9 wherein said fins are generally beveled towards the radial axis thereof to form a pocket therebetween.

11. The invention of claim 10 wherein said fins are disposed in a generally "X-shaped," and wherein said venting channels are radially disposed on said top to generally bisect the angles formed by said fins.

12. The invention of claim 5 wherein said sealing strip has a substantially greater width than the diameter of said ports.

13. The invention of claim 12 wherein said adhesive strip has a diameter substantially equal to the diameter of said disposable inserts.

14. A method of packaging a charged and dumped battery comprising the steps of:
 (a) applying a thin sheet material battery sealing strip having a plurality of indentations thereon forming protrusions extending from one side thereof so that each of said protrusions is disposed of generally within the fill holes of said batteries and said sealing strip is otherwise disposed at least over the top surface of said fill holes;
 (b) inserting a plurality of disposable inserts, one of each fill hole, into each fill hole to establish a press fit between said insert and said fill hole with said protrusion therebetween, said insert being placed to seal said strip against the top surface of said fill hole; and
 (c) applying an adhesive strip across said disposable inserts to engage said inserts, said sealing strip between said inserts, and at least a portion of the battery case.

15. The invention of claim 14 wherein said method further comprises the steps of:
 (d) storing said battery;
 (e) removing said battery package from said charged and dumped battery by peeling a portion of said adhesive strip from said battery case; and
 (e) lifting said adhesive portion generally away from said battery to pull the sealing strip and disposable inserts away therefrom.

* * * * *